(12) United States Patent
Zysk

(10) Patent No.: US 8,798,858 B2
(45) Date of Patent: Aug. 5, 2014

(54) EMERGENCY RELEASE LOCKING SYSTEM, VEHICLE THERETO, AND METHOD FOR OPERATING THE LOCKING SYSTEM

(71) Applicant: Volkswagen AG, Wolfsburg (DE)

(72) Inventor: Florian Zysk, Berlin (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/788,876

(22) Filed: Mar. 7, 2013

(65) Prior Publication Data

US 2013/0238187 A1 Sep. 12, 2013

(30) Foreign Application Priority Data

Mar. 7, 2012 (DE) .......................... 10 2012 004 792

(51) Int. Cl.
| | | |
|---|---|---|
| *H02H 11/00* | (2006.01) | |
| *E05B 65/12* | (2006.01) | |
| *B60K 35/00* | (2006.01) | |
| *F16P 3/00* | (2006.01) | |

(52) U.S. Cl.
CPC ............... *E05B 81/56* (2013.01); *B60K 35/00* (2013.01); *F16P 3/00* (2013.01); *E05B 83/26* (2013.01); *E05B 77/54* (2013.01)
USPC .............. 701/36; 701/39; 307/10.1; 307/326; 340/426.29

(58) Field of Classification Search
USPC ........... 701/36, 39; 340/425.5, 426.1, 426.28, 340/426.29, 438, 446, 447, 573.1; 292/92, 292/201, 216, 449; 307/10.1, 326
See application file for complete search history.

(56) References Cited

U.S. PATENT DOCUMENTS

| | | | | |
|---|---|---|---|---|
| 6,018,292 A | * | 1/2000 | Penny, Jr. ................. | 340/426.29 |
| 6,222,442 B1 | * | 4/2001 | Gager et al. ............. | 340/426.29 |
| 6,335,687 B1 | * | 1/2002 | Terashima et al. ......... | 340/573.1 |
| 6,339,376 B1 | * | 1/2002 | Okada ........................... | 340/562 |
| 6,369,395 B1 | * | 4/2002 | Roessler .................... | 250/462.1 |
| 6,433,292 B1 | * | 8/2002 | Tate ............................... | 200/512 |
| 6,831,376 B2 | | 12/2004 | Franke et al. | |
| 7,341,289 B2 | | 3/2008 | Schretzlmeier et al. | |
| 8,186,730 B2 | * | 5/2012 | Berghahn et al. ............ | 292/201 |
| 8,215,683 B2 | | 7/2012 | Drescher et al. | |

(Continued)

FOREIGN PATENT DOCUMENTS

| | | |
|---|---|---|
| DE | 101 43 263 C1 | 5/2003 |
| DE | 10 2005 021 740 A1 | 11/2006 |

(Continued)

*Primary Examiner* — Thomas Tarcza
*Assistant Examiner* — Tyler J Lee
(74) *Attorney, Agent, or Firm* — Muncy, Geissler, Olds & Lowe, P.C.

(57) ABSTRACT

An emergency release locking system for a trunk lid, with a lid lock and a catch device which has a catch hook and in the case of the opened rotary latch limits the opening movement of the lid, with an emergency release system disposed in the trunk, and with an actuator that is controlled by a control unit of the vehicle and drives a blocking element, which above a predetermined or predeterminable recommended speed of the vehicle stops at least the releasing action of the emergency release system on the catch hook of the catch device. The control unit is assigned, apart from a sensor unit for detecting the current driving speed of the vehicle, one sensor unit each for detecting the current operating position of the emergency release system and of the catch hook of the catch device.

14 Claims, 5 Drawing Sheets

(56) References Cited

U.S. PATENT DOCUMENTS

| | | | |
|---|---|---|---|
| 2004/0189450 A1* | 9/2004 | Pratt | 340/426.29 |
| 2006/0255595 A1* | 11/2006 | Schretzlmeier et al. | 292/93 |
| 2006/0290518 A1 | 12/2006 | Bingle et al. | |
| 2007/0216170 A1* | 9/2007 | Drescher et al. | 292/201 |
| 2011/0025077 A1* | 2/2011 | Meyer et al. | 292/216 |
| 2012/0138492 A1 | 6/2012 | Gruber | |
| 2012/0161453 A1* | 6/2012 | Zysk et al. | 292/21 |
| 2013/0140831 A1* | 6/2013 | Kempel et al. | 292/3 |

FOREIGN PATENT DOCUMENTS

| | | |
|---|---|---|
| DE | 10 2006 012 062 A1 | 9/2007 |
| DE | 10 2007 029 679 A1 | 1/2009 |
| DE | 20 2009 010 975 U1 | 1/2011 |
| DE | 10 2009 037 037 A1 | 2/2011 |

* cited by examiner

EMERGENCY RELEASE LOCKING SYSTEM, VEHICLE THERETO, AND METHOD FOR OPERATING THE LOCKING SYSTEM This nonprovisional application claims priority under 35 U.S.C. §119(a) to German Patent Application No. DE 10 2012 004 792.4, which was filed in Germany on Mar. 7, 2012, and which is herein incorporated by reference.

BACKGROUND OF THE INVENTION

1. Field of the Invention

The invention relates to an emergency release locking system for a lid closing a trunk of a vehicle, particularly a motor vehicle. Further, the invention also relates to a vehicle with a locking system of this type and to a method for operating the locking system.

2. Description of the Background Art

To prevent an unauthorized opening of lids or doors of vehicles, particularly motor vehicles, these are typically assigned a locking device, which fixes the lid in its locked position. Such locking devices predominantly have a lid lock which is attached to the body of the vehicle and comprises a rotary latch and a pawl working together therewith. In the locked state, the rotary latch secures a bow-shaped or hook-shaped closing element, attached to the lid. The rotary latch is typically acted upon by a spring force in the direction of its release position. In order to keep the rotary latch in its locked position, it locks in place with the pawl, which holds the rotary latch in the locked position against said spring force. By actuation of the pawl and the subsequent release of the latching, the rotary latch is released and the lid can be opened. In the case of lids of vehicles, which are located in the front of the vehicle and open forwards, an additional safety mechanism is needed, which prevents the lid from being opened completely during driving due to the air flow after improper actuation or improper closing of the lid. This is particularly the case with engine hoods and in vehicles where the trunk is located in the front of the vehicle. In this respect, to secure the lid a pivotable catch hook is provided, which in its catch position catches the closing element, released by the rotary latch, in a gap opening position of the lid. The catch hook in its catch position thus permits opening of the lid only up to the gap opening position in which the lid is typically pushed by a spring element. Further or complete opening of the lid is only possible when the catch hook is released from the closing element. This can occur either by a pivoting of the closing element or by reactuation of the locking device, as disclosed, for example, in DE 20 2009 010 975 A1, which corresponds to US 20120138492. The locking device disclosed here is actuated to open the lid by a Bowden cable.

Locking devices of this type increasingly must reliably fulfill more exacting requirements in regard to safety aspects and regulations. Legislative measures, for example, the regulations for the vehicle market that came into effect in the United States of America on Sep. 1, 2001, for internal trunk operation in motor vehicles, "Internal Trunk Release FMVSS 401," require a trunk emergency release system with which a person locked in the trunk can free himself by operating a suitable handle of an emergency release system. According to the definition underlying this regulation, a trunk is a space intended for the transport of luggage or cargo, which is separated from the driver compartment or passenger compartment of the vehicle by a partition or by a fixed or fold-down row of seats, can be closed outwardly by a trunk lid or deck lid, and has an interior space which with a closed and locked trunk lid can accommodate a 3-year-old child dummy. In vehicles in which, due to the design, for example, because the engine is placed in the rear of the vehicle, the trunk is located in the front, therefore under a front lid, the following provisions should be considered according to the aforementioned regulations:

When the vehicle is moving forward at a speed of 5 km/h or greater, in the event of improper or unintentional unlatching of the lid lock by a secondary securing device, for example, by the above-described catch hook, the trunk lid must be prevented from opening further, on the one hand, in order to protect the person possibly present in the trunk and, on the other, to prevent the swinging open of the lid due to the air flow, which would impede the view of the vehicle driver in the direction of travel in a most disadvantageous manner.

When the vehicle is moving forward at a speed less than 5 km/h, the trunk lid must be released by actuation of the emergency release system via a suitable handle. In addition, it is allowable at this speed that the emergency release system has a releasing effect on the catch device to enable the wider opening of the trunk lid. When the vehicle is standing still, an unimpeded opening of the trunk lid must be assured upon actuation of the emergency release system.

Very different designs for closing systems with such an emergency release function have been known for quite some time. DE 10 2006 012 062 A1, which corresponds to U.S. Pat. No. 8,215,683, which is incorporated herein by reference, and which discloses a closing device, in particular for a trunk lid of a motor vehicle with a rotary latch which interacts with a lid-side locking clamp. The rotary latch is held securely in a closed position by means of a pawl. The closing device comprises a lid-side catch hook which can be caused to engage with a catch element after movement of the pawl to the open position and by which the lid is to be kept in the holding position, whereby the catch hook can be moved from the holding position to an open position in which the lid can be completely opened. The rotary latch and the catch hook are made as separate parts. The pawl of the rotary latch and the catch hook can thereby be actuated sequentially one after the other via a common remote actuation element, whereby to actuate the catch hook a catch hook lever is provided, which acts on the catch hook disposed on the lid side. In order the meet the safety provisions here in regard to the speed-dependent allowability of an emergency release, in the trunk, particularly in the front trunk, a handle for emergency release is provided, which is assigned a blocking device with which the actuation of the catch hook can be stopped depending on the driving speed. The blocking device includes an electromagnet, which is energized or not depending on the driving speed. In regard to the speed-dependent emergency release addressed above, DE 10 2007 029 679 A1 discloses a comparable solution, whereby an actuator, not more closely defined, is provided here which is activated depending on the driving speed in order to prevent a lid located in the front area from being opened completely while the vehicle is moving.

Further, a method for releasing a trunk lid of a vehicle is proposed in DE 101 43 263 C1, which corresponds to U.S. Pat. No. 6,831,376. In this regard, a release handle, which for its part is connected to a control unit in the vehicle, is disposed in the interior of the trunk. When the release handle is actuated, a microswitch is actuated and the contact is detected in the control unit as a signal for the actuation of the release handle. Parallel to the signal of the release handle, the signal of the speed of the vehicle is detected in the control unit. The control unit analyzes, these signals and when suitable conditions are present (e.g., speed is zero) controls an adjusting element, which then causes the release of the catch hook for the trunk lid. If a speed greater than zero is detected, a predetermined delay time is started and information is simultaneously provided to the driver. After the delay time has expired, the trunk lid is released for opening. More precise data on the adjusting element per se cannot be derived from this publication.

The conventional solutions have in common that to meet the higher safety standards or safety provisions, defined more closely above, in regard to the speed-dependent allowability of an emergency release, the blocking device engaging at the catch hook or the actuator is subject to very high numbers of load cycles (>500,000) in that the blocking device blocks the catch hook at a vehicle speed of, for example, ≥5 km/h, in order to a release it again for a possibly complete opening of the trunk lid at a driving speed <5 km/h. The blocking device disclosed in DE 10 2006 012 062 A1 in the form of an electromagnet is certainly suitable for satisfying the high numbers for load cycles in the case of sufficient stability. Irrespective of this, such a blocking device is associated with relatively high costs.

In contrast, DE 10 2005 021 740 A1, which corresponds to U.S. Pat. No. 7,341,289, which is incorporated herein by reference, discloses an emergency release system for a trunk lid with a trunk lock, which comprises at least one lock latch and a cooperating locking part, with a catch which limits the trunk opening motion and comprises a catch hook, which can be actuated from outside the trunk to cancel the motion limitation, and a cooperating catch hook engagement element, and with an emergency release system, which is disposed in the trunk and which when actuated acts to open the trunk lock and to release the catch device. To offer the higher safety standard and to meet safety provisions in regard to the speed-dependent allowability of an emergency release, the actions applied by the emergency release system on the catch lock and the catch are decoupled from one another. Further, a speed-dependent electrical actuating element is provided, which is supplied with current vehicle speed values tapped at a front wheel. If upon actuation of an emergency release system located in the trunk, the currently measured driving speed exceeds a corresponding threshold, the actuating element activates a blocking lever, which for its part acts on the catch hook engagement element such that the catch hook retains its engaged position during opening (release) of the trunk lid and prevents wider opening of the trunk lid. In other words, the actuating element with the blocking lever is advantageously activated only when actuation of the emergency release system is detected. A much lower number of load cycles is to be set, which results in lower wear of the actuating element and thereby a longer lifetime. Irrespective of this, however, a situation is also conceivable in which the catch hook engagement element due to the actuation of the emergency release system is already in an open position and movement of the catch hook to its release position is made possible. If at this moment a vehicle speed greater than a specific threshold value is detected, the trunk lid can be opened despite the increased driving speed or open automatically due to, for example, air flow, which can have a very disadvantageous effect both on the vehicle driver due to obstruction of the forward view and also on the child, for example, in the trunk.

SUMMARY OF THE INVENTION

Therefore, it is an object of the invention to improve further the emergency release system in regard to the noted improper use situations of the trunk of a vehicle with retention of the advantages of known emergency release systems, particularly with assurance of the higher safety standard defined in greater detail above or safety provisions. Furthermore, it is an object of the invention to provide a method for operating an emergency release system for a lid closing a trunk of a vehicle.

In an embodiment, an emergency release locking system is provided for a lid closing a trunk of a vehicle, particularly a motor vehicle, with a lid lock, which has at least one rotary latch and a closing element corresponding to the latch, with a catch device that limits the opening movement of the lid with an opened rotary latch and for its part has at least one catch hook, with an emergency release system, which is located in said trunk and which during system actuation acts to open the rotary latch of the lid lock and to release the catch hook of the catch device, and with an actuator, which for its part is controlled by a control unit of the vehicle and drives a blocking element, which above a predetermined or predeterminable recommended speed of the vehicle stops at least the releasing action of the emergency release system on the catch hook of the catch device. Advantageously, the control unit is now assigned, apart from a sensor unit for detecting the current driving speed of the vehicle, one sensor unit each, disposed at the emergency release system and at the catch device, for detecting the current operating position of the emergency release system and of the catch hook of the catch device.

These measures make it possible that when there is a significant decrease in the number of load cycles, the actuator is operated above a predetermined recommended speed of the vehicle in terms of stopping the releasing action of the emergency release system on at least the catch device only when, on the one hand, an actuation of the emergency release system or, on the other, due to the actuation of the emergency release system a release position of the catch hook of the catch device is detected.

Supposing that, for example, a threshold value or a recommended speed of 5 km/h is set and there is a child in the vehicle trunk that actuates the emergency release system at a driving speed greater than 5 km/h, the actuation is first detected by sensors and next the actuator is operated in terms of stopping the releasing action of the emergency release system on at least the catch device. The actuator blocks or fixes, as it were, the catch hook in its catch position. If the catch hook, however, has assumed a locked and sensor-detected release position and just at this moment a driving speed greater than 5 km/h is noted, the locking is actively released by the actuator and the catch hook is taken back by spring force to its catch position, in order to stop the complete opening of the trunk lid. If, in contrast, during actuation of the emergency release system and with the catch hook in the release position, a driving speed below 5 km/h, accordingly also 0 km/h, is detected, the actuator remains in the non-activated operational state. The trunk lid can be opened completely without obstruction by the catch hook.

Because of the low number of load cycles, relative to the conventional art, it is now made possible, instead of a relatively cost-intensive electromagnetically powered linear drive, to provide a more cost-effective actuator in the form of an electrically powered servo motor. As regards the sensor units for detecting the current operating position of the emergency release system and of the catch hook of the catch device, in the improvement of the invention these are formed advantageously in each case by at least one likewise cost-effective microswitch. A simple and cost-effective emergency release system comprises a handle which is disposed in the trunk of the vehicle and is connected for its part mechanically to the lid lock or electrically or without cables to an actuation unit engaging with the trunk lock, particularly an electrically powered actuation unit. Advantageously, furthermore, the emergency release system is assigned or can be assigned an optical and/or acoustic signal generator activatable during actuation of the system, in order to inform especially the vehicle driver promptly of an improper use situation in regard to the trunk or of a person present in the trunk.

The invention also relates to a vehicle with an emergency release locking system of the above-described type.

In an embodiment, a method is provided for operating an emergency release locking system for a lid closing a trunk of a vehicle, with a lid lock, which has at least one rotary latch and a closing element corresponding to it, with a catch device which limits the opening movement of the lid with an opened rotary latch and for its part has at least one catch hook, with an emergency release system, which is located in said trunk and which during system actuation to open the rotary latch of the lid lock and to release the catch hook of the catch device, and with an actuator, which for its part is controlled by a control unit of the vehicle and drives a blocking element, which above a predetermined recommended speed of the vehicle stops the releasing action of the emergency release system on at least the catch hook of the catch device, whereby the control unit is assigned, apart from a sensor unit for detecting the current driving speed of the vehicle, one sensor unit each, disposed at the emergency release system, and at the catch device for detecting the current operating position of the emergency release system and of the catch hook of the catch device, whereby the actuator is operated in terms of stopping the releasing action of the emergency release system on at least the catch device, when an actuation of the emergency release system above a predetermined recommended speed of the vehicle is detected, and whereby further the actuator is operated in terms of stopping the releasing action of the emergency release system on at least the catch device, when due to the actuation of the emergency release system a release position of the catch hook of the catch device has already been brought about and detected by sensors, but a driving speed above a predetermined recommended speed of the vehicle is detected.

An electrically powered servo motor can be used as an actuator. Microswitches can be used as sensor units for detecting the current operating position of the emergency release system and of the catch hook of the catch device. Further, an optical and/or acoustic signal are provided to a vehicle driver in regard to a determined actuation of the emergency release system and/or a detected release position of the catch hook of the catch device at least above said recommended speed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
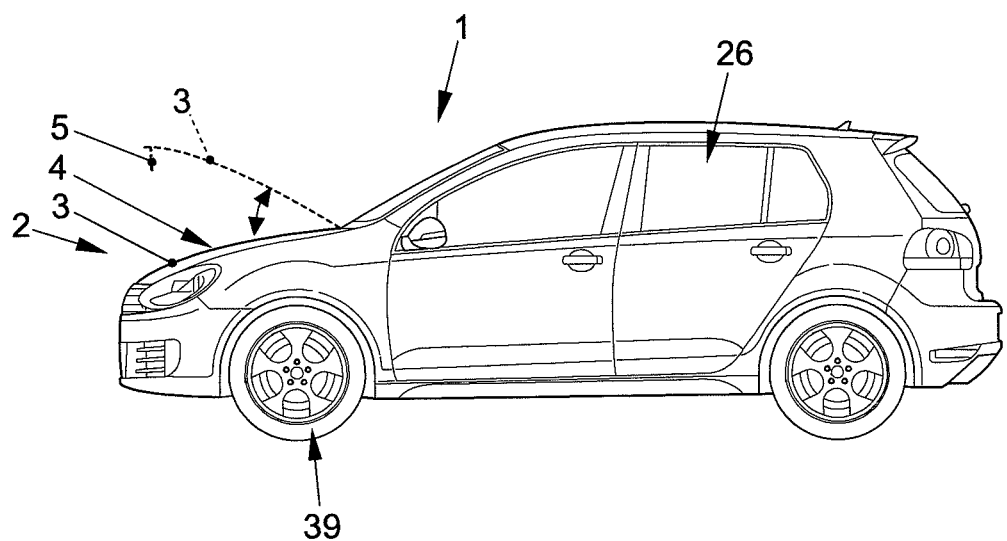
FIG. 1 shows a vehicle, in the present case a passenger vehicle, with a trunk located in the front end of the vehicle and closable by a pivotable lid.

FIG. 1 shows first a vehicle 1, in the present case a passenger vehicle, with a lid 3 located in the area of the front end 2 of vehicle 1 and opening toward the front and shown in both the closed and opened (dotted line) state, by means of which a trunk 4 also located in the front end 2 can be closed. Trunk lid 3 has a bow-shaped or hook-shaped closing element 5 known per se, which corresponds to a lid lock 6, shown in greater detail in FIGS. 2 to 5 and fixed to the body of vehicle 1, and is locked in the closed state of lid 3 by lid lock 6.

To this end, lid lock 6 furthermore has a rotary latch 7, which is known per se and therefore not described in greater detail in regard to its function and which holds closing element 5 form-fittingly in the closed state of lid 3. A pawl 8, which is made as a two-armed lever pivotable around an axis of rotation 9, works together with rotary latch 7. The end of the one (first) lever arm 8a of pawl 8 in this case can be latched in place with rotary latch 7, in order to keep it in its position locking closing element 5. The latching in this case is made self-locking so that the latching cannot be released without the action of forces from the outside. The end of the second lever arm 8b of pawl 8 is rigidly connected to an end of a sleeve 10 of a Bowden cable 11. If the latching of rotary latch 7 is released, a spring 12 pushes closing element 5 out of rotary latch 7, as a result of which rotary latch 7 in the present case is turned clockwise and releases closing element 5. To secure the latching, pawl 8 is configured to be spring-controlled (not shown graphically). The spring necessary for this is operatively connected to pawl 8 such that second lever arm 8b is pretensioned in the direction of rotary latch 7. To release the latching, therefore, pawl 8 must be shifted or pivoted against the spring force.

Figure 2:
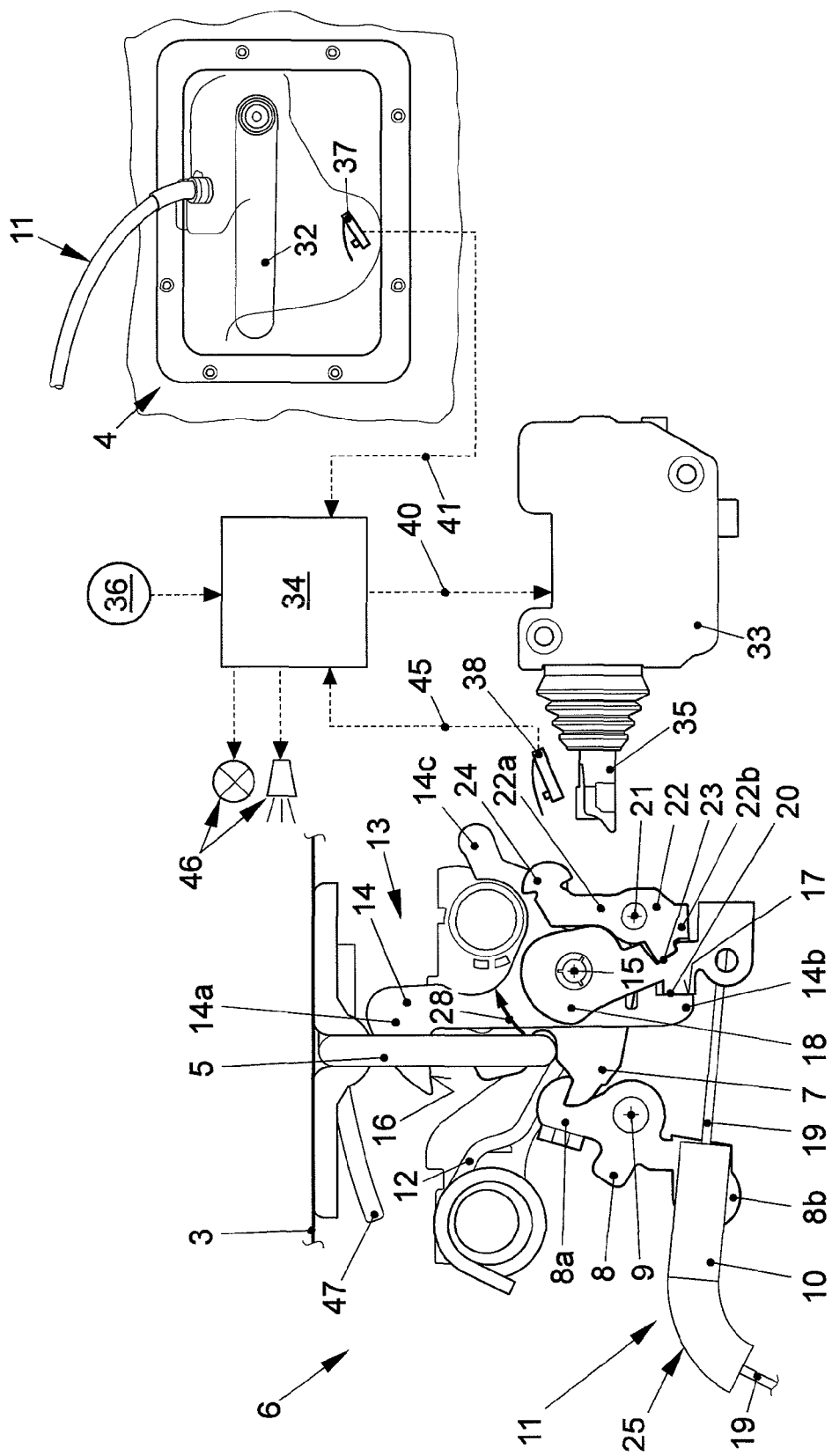
FIG. 2 shows a lid lock for the trunk lid in the locked position, with an emergency release locking system configured according to the invention.

Furthermore, lid lock 6 has a catch device 13 with a catch hook 14, which catches closing element 5 in its catch position shown in FIG. 2, as soon as it was released by rotary latch 7, so that lid 3 is held in a gap opening position and prevented from opening further. Catch hook 14 here is mounted pivotable around an axis of rotation 15 and is also spring-controlled in the direction of its catch position (FIG. 2). Catch hook 14 further is also made as a two-armed lever, whereby the one (first) lever arm 14a works together with closing element 5 as described above. Thus, first lever arm 14a at its free end has a stop 16 as a rear grip, which in the catch position works together with closing element 5. Second lever arm 14b of catch hook 14 at its free end has a catch hook stop 17. Catch hook 14 furthermore has a driving lever 18, which is also mounted pivotable around axis of rotation 15 of catch hook 14. Driving lever 18 is formed as a one-armed lever whose free end is connected to an end of core 19 of Bowden cable 11. Between its free end and axis of rotation 15, driving lever 18 has a projection 20, which points toward catch hook 14 and in the locking position of catch hook 14 lies against catch hook stop 17 of said hook. Driving lever 18 thus can be pivoted maximally until catch hook stop 17 is reached relative to catch hook 14.

Furthermore, driving lever 18 is assigned a locking lever 22 pivotable around axis of rotation 21. Locking lever 22 is configured as a two-armed lever, whereby a first lever arm 22a of locking lever 22 has a detent projection 23 and the second lever arm 22b an actuating cam 24 at its free end. In the locking position, locking lever 22 with its side facing driving lever 18 lies against driving lever 18 in such a way that further shifting of the same in the locking direction is prevented. As a result, the maximum achievable locking position by catch hook 14 is predetermined by catch hook stop 17, driving lever 18, and locking lever 22.

As already stated above, Bowden cable 11 is connected with the end of its sleeve 10 to pawl 8 and with its core 19 to the free end of driving lever 18. The end of sleeve 10 is followed by a redirection of core 19 in the form of a preferably stiff curving 25 of sleeve 10. Alternatively, sleeve 10 and/or core 19 can also be guided or redirected by a pipe angle or the like following the end of sleeve 10 and disposed at pawl 8 (not shown graphically).

Lid lock 6 in its normal function will be described in greater detail below. According to FIG. 3, Bowden cable 11 is actuated, for example, by means of a handle which is disposed in passenger compartment 26 of vehicle 1, known per se, and accordingly not shown graphically in greater detail. The invention, however, is not limited to said handle, but also includes a "comfort unlocking," by means of which lid 3 is opened via an electrical or electromechanical actuation element, engaging at Bowden cable 11, due to actuation of a button by the vehicle driver or someone else or due to a reaction to the actuation or sensing of a remote key of vehicle 1 (not shown graphically). Core 19 of Bowden cable 11 is pulled here in the direction of arrow 27, and lever arm 8b of pawl 8 and the free end of driving lever 18 are moved toward one another. As a result, lever arm 8a of pawl 8 is released from the latching with rotary latch 7. At the same time, driving lever 18 is pivoted in the direction of pawl 8. Driving lever 18 in this case takes along catch hook 14, which for its part is pivoted out of its catch position in the direction of arrow 28, because projection 20 of driving lever 18 is in contact with catch hook stop 17.

Figure 4:
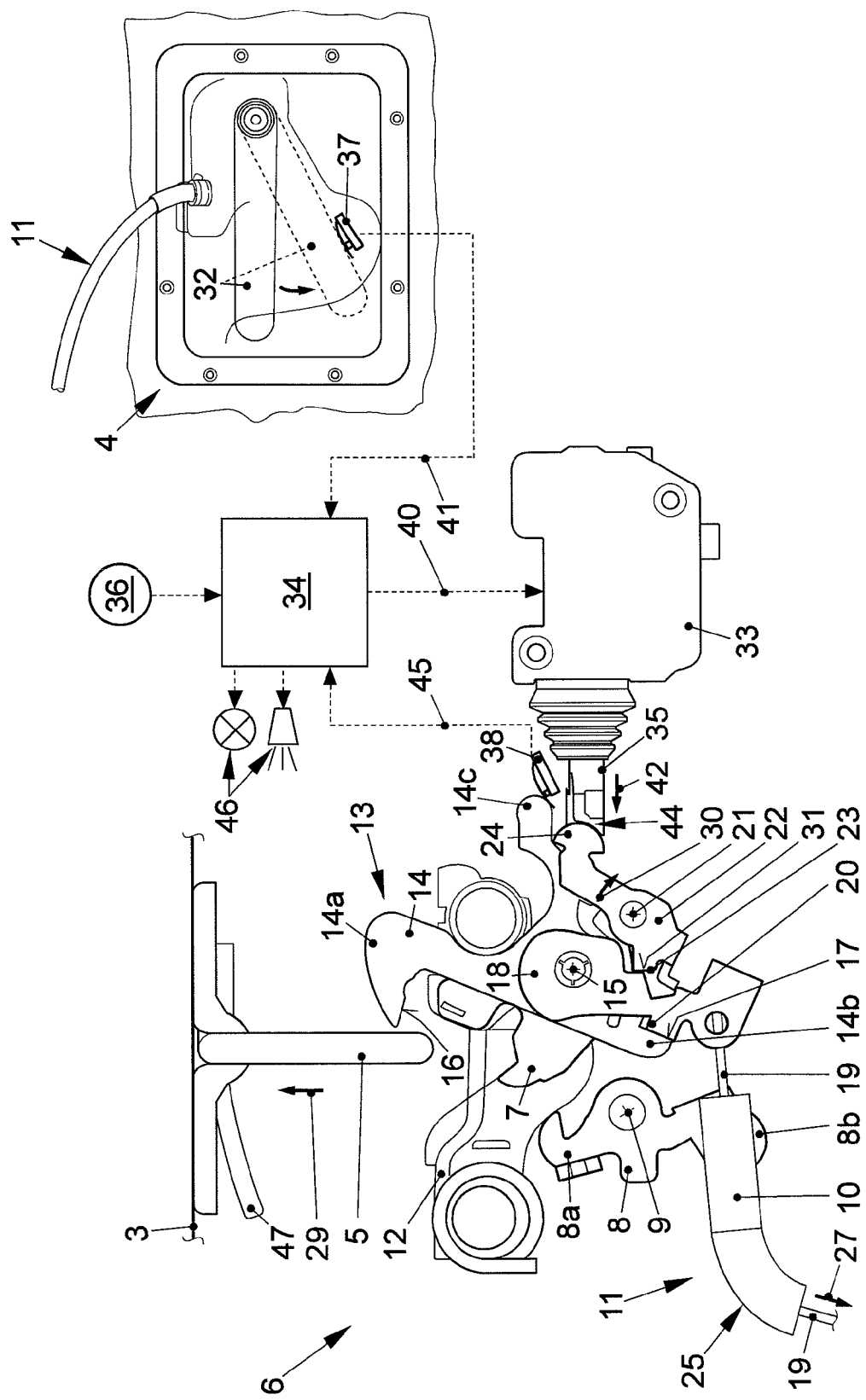
FIG. 4 shows the lid lock according to FIG. 2 or 3 in the release position.

Because rotary latch 7 is now no longer locked by pawl 8, spring 12 pushes closing element 5 out of the latching with rotary latch 7 in the direction of arrow 29, as a result of which rotary latch 7 is rotated into its release position (cf. FIG. 4). Closing element 5 can be removed from lid lock 6 and accordingly trunk lid 3 can be opened completely.

Figure 3:
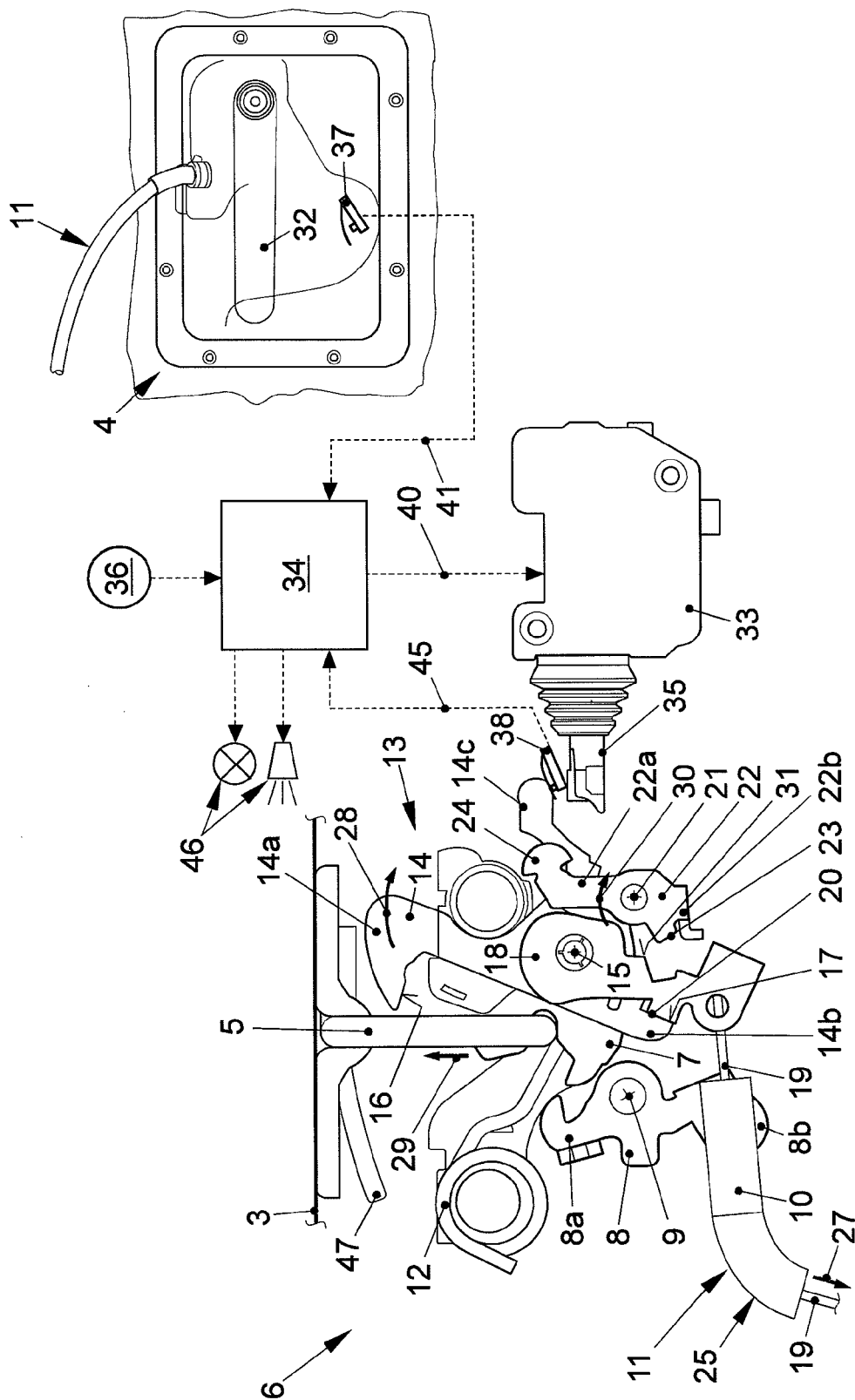
FIG. 3 shows the lid lock according to FIG. 2 in a partially unlocked position.

By actuation of Bowden cable 11 and pivoting of catch hook 14 to its release position, driving lever 18 moves away from locking lever 22 (FIG. 3). However, because locking lever 22 is also spring-controlled, namely, in such a way that it is pushed with its second lever arm 22b in the direction of driving lever 18 (clockwise according to arrow 30), detent projection 23 of locking lever 22 is brought into a corresponding detent seat 31 of driving lever 18 (FIG. 4). The thus formed latching is self-locking, because driving lever 18 is pushed by the spring-controlled catch hook 14 against locking lever 22, so that the latching is maintained. This assures that after a single actuation of Bowden cable 11 or said handle, lid lock 6 remains completely opened and lid 3 can be completely opened.

If an emergency release system 32, disposed in trunk 4 of vehicle 1 and preferably also formed as a handle (cf. FIGS. 2 to 5), is connected parallel to said handle at Bowden cable 11, a process sequence comparable to the one described occurs, when a child inadvertently locked in trunk 4 actuates emergency release system 32. Of course, it is also possible and accordingly covered by the invention, to provide, apart from Bowden cable 11, a separate Bowden cable for emergency release system 32 (not shown graphically). Moreover, emergency release system 32 can also be connected electrically or without cables to a separate actuation unit, engaging lid lock 6, particularly an electrically or electromechanically powered actuation unit (not shown graphically).

In order to satisfy the higher safety standards or safety provisions, discussed above, for an emergency release locking system in regard to improper use situations of trunk 4 of a vehicle 1, emergency release system 32 is assigned an actuator 33, which for its part is controlled by a control unit 34 of vehicle 1 and drives a blocking element 35 that stops the releasing action of emergency release system 32 on catch hook 14 above a predetermined or predeterminable recommended speed of, for example, 5 km/h. Control unit 34 in this case, on the one hand, receives information on the current driving speed of vehicle 1 and, on the other, on the current operating position of emergency release system 32 or the handle of the same and catch device 13 or its catch hook 14.

Said information is provided by sensor units 36, 37, 38. Thus, the current driving speed can be determined, for example, by a sensor unit 36 disposed on a vehicle wheel 39 and be provided to control unit 34. As regards sensor units 37, 38 for detecting the current operating position of emergency release system 32 or the handle thereof and catch device 13 or its catch hook 14, these can be formed by microswitches, whereby in the present case the one sensor unit 37 is disposed directly at emergency release system 32 in the form of the handle and detects the actuating movement thereof, which as in the present case can be a pivoting movement or also an axial movement. The other sensor unit 38, here in the form of the microswitch, is disposed in the area of an extension 14c of catch hook 14, whereby said extension 14c due to movement of catch hook 14 to its locked release position closes the contact of the microswitch, from which control unit 34 deduces the actuation of catch hook 14 (FIG. 3).

With consideration of the provided information, when necessary, control unit 34 generates a control signal 40 for said actuator 33. Actuator 33 according to an advantageous embodiment is configured as an electrically powered servo motor known per se, which for its part is more cost-effective in regard to the electromagnetically powered linear drives favored according to the state of the art. Said servo motor has an axially movable blocking element 35 in the form of an actuation plunger.

Figure 5:
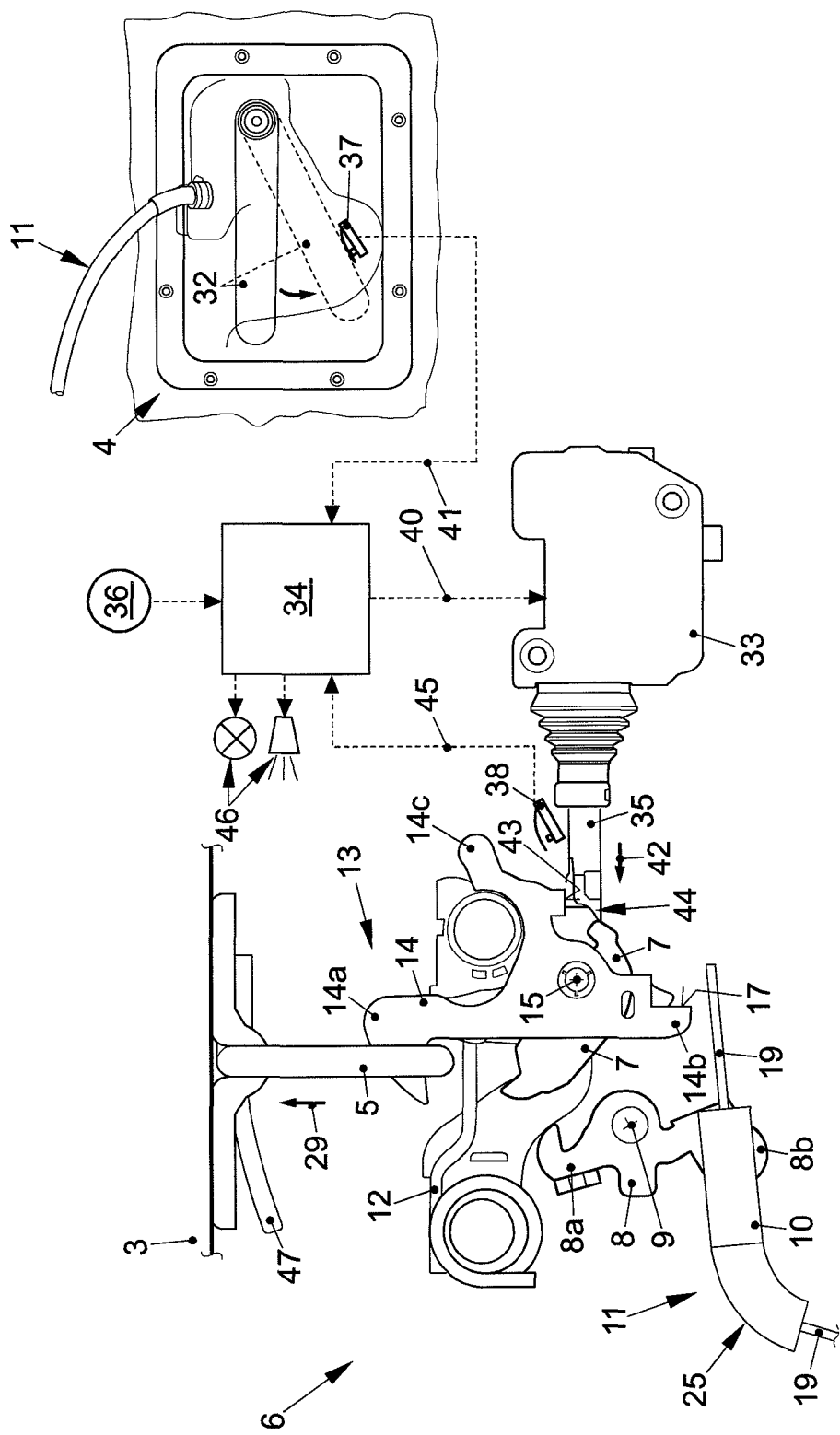
FIG. 5 shows the lid lock in the case of an actuated emergency release but in a safety position.

Supposing that, for example, a threshold value or a recommended speed of 5 km/h is predetermined and a child is locked in trunk 4 of vehicle 1 that actuates emergency release system 32 at a driving speed greater than 5 km/h detected by means of sensor unit 36, according to FIG. 5 said actuation is detected first by means of sensor unit 37, assigned to emergency release system 32, and a corresponding signal 41 is transmitted to control unit 34. Subsequently, control unit 34 then generates control signal 40 for actuator 33 in terms of stopping the releasing action of emergency release system 32 on catch device 13, particularly its catch hook 14.

In this respect, according to FIG. 5, blocking element 35 of actuator 33, which is configured as an actuation plunger, is moved according to arrow 42 in the direction toward catch hook 14 until the free end of the actuation plunger comes into contact with a stop 43 of catch hook 14 which is in the catch position. Catch hook 14 is thus locked in said catch position. In the present case, said stop 43 is oriented in the rotation direction, so that catch hook 14 is prevented from pivoting around its axis of rotation 15 by the lateral movement of the actuation plunger below stop 43. Driving lever 18 and locking lever 22 are not shown in FIG. 5 for the sake of clarity. The free end of blocking element 35 or actuation plunger in this case is formed as connecting member 44 so that in the locked state of catch hook 14 rotary latch 7 nevertheless is pivotable to its release position. If now due to further actuation of emergency release system 32 Bowden cable 11 is actuated, catch hook 12 is prevented from pivoting as long as a driving speed of 5 km/h or greater is detected by sensors. Only pawl 8 is released by rotary latch 3. Closing element 5 of lid 3 is in fact released from rotary latch 7 and pushed by spring 12 into the opening position in the direction of arrow 29, but catch hook 14 is still in its catch position and catches closing element 5, so that lid 3 is held only in said gap opening position and is prevented from opening further.

Blocking element 35 or the actuation plunger after actuation of emergency release system 32 can be permanently in contact with catch hook 14 as long as a driving speed of 5 km/h or greater is detected or can only lock catch hook 14 directly during actuation of emergency release system 32 and subsequently again return to its starting position.

If, according to FIG. 4, in contrast, catch hook 14 has already assumed its locked release position detected by sensor unit 38 (signal 45), in that detent projection 23 of blocking lever 22 is brought into the corresponding detent seat 31 of driving lever 18, and just at this moment a driving speed of 5 km/h or greater is detected by sensor unit 36, another section of connecting member 44 of blocking element 35, designed as a plunger, is used to release catch hook 14, which is in its release position, from the previously described locking. To this end, in the present case, connecting member 44 works together with actuating cam 24 of blocking lever 22 in such a way that by axial movement of blocking element 35 or plunger towards actuating cam 24, detent projection 23 of locking lever 22 is moved out of detent seat 31 and the latching of blocking lever 22 is removed. Because of the spring force application, catch hook 14 is then pivoted back to its catch position (cf. catch position of catch hook 14 according to FIG. 5).

Actuator 33 is thus actuated to prevent a complete release of lid lock 6 or to release the locking which keeps catch hook 14 in its release position. The last actuation occurs preferably, on the one hand, when during a normal opening and closing process of lid 3, lid lock 6 is to be again completely latched and, on the other, when emergency release system 32 was actuated and closing element 5 is still not outside the catch region of catch hook 14, so that during the acceleration of vehicle 1 above 5 km/h catch hook 14 is moved back to its catch position, in order to prevent a wider opening of lid 3.

If during the actuation of emergency release system 32 and with catch hook 14 in the release position, a driving speed less than 5 km/h is detected, actuator 33 remains in the non-activated operational state. Trunk lid 3 can be opened completely without obstruction by catch hook 14.

In order to inform the vehicle driver of any actuation of emergency release system 32, the system is assigned an optical and/or acoustic signal generator 46 which is activatable during an actuation. Thus, the vehicle driver is put in the position of stopping vehicle 1 after the driver becomes aware of the actuation of emergency release system 32 and if necessary releasing lid 3 from the outside, in that the driver actuates a lever 47 known per se, which for its part is capable of pivoting closing element 5 out of the catch position of catch hook 14, so that lid 3 can be opened completely.

During a closing process of lid 3, closing element 5 is first pushed toward the free end of first lever arm 14a of catch hook 14. Because said free end is made curved, catch hook 14 is first pivoted in the direction of arrow 28 so that after passing of closing element 5 it springs the element back by spring force, receiving it form-fittingly. Subsequently, closing element 5 is pressed farther into rotary latch 7 until it locks with spring-loaded pawl 8. Lid lock 6 is now completely latched with closing element 5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An emergency release locking system for a lid closing a trunk of a vehicle with a lid lock that has at least one rotary latch and a closing element corresponding to the latch, the system comprising:
 a catch device adapted to limit an opening movement of the lid with an opened rotary latch;
 at least one catch hook;
 an emergency release system arranged in the trunk and which during system actuation acts to open the rotary latch of the lid lock and to release the catch hook of the catch device; and
 an actuator controllable by a control unit of the vehicle, the actuator configured to drive a blocking element, which above a predetermined or predeterminable recommended speed of the vehicle stops at least a releasing action of the emergency release system on the catch hook of the catch device,
 wherein the control unit is assigned, apart from a sensor unit for detecting the current driving speed of the vehicle, a sensor unit arranged at the emergency release system and a sensor unit arranged at the catch device for detecting a current operating position of the emergency release system and of the catch hook of the catch device.

2. The locking system according to claim 1, wherein the actuator is formed by an electrically powered servo motor.

3. The locking system according to claim 1, wherein the sensor units are at least one microswitch for detecting the current operating position of the emergency release system and of the catch hook of the catch device.

4. The locking system according to claim 1, wherein the emergency release system comprises a handle disposed in the trunk of the vehicle, said system being connectable mechanically to the lid lock or electrically or without cables to an actuation unit engaging with the lid lock, particularly an electrically powered actuation unit.

5. The locking system according to claim 1, wherein the emergency release system is assigned an optical and/or acoustic signal generator activatable during actuation of the system.

6. A vehicle with an emergency release locking system according to claim 1.

7. A method for operating an emergency release locking system for a lid closing a trunk of a vehicle, with a lid lock, which has at least one rotary latch and a closing element corresponding to the latch, the method comprising:
 providing a catch device that limits the opening movement of the lid with an opened rotary latch and has at least one catch hook;
 providing an emergency release system, which is arranged in the trunk and which during system actuation acts to open the rotary latch of the lid lock and to release the catch hook of the catch device; and
 providing an actuator that is controllable by a control unit of the vehicle and drives a blocking element, which above a predetermined recommended speed of the vehicle stops the releasing action of the emergency release system on at least the catch hook of the catch device;

assigning to the control unit, besides a sensor unit for detecting the current driving speed of the vehicle, a sensor unit arranged at the emergency release system and a sensor unit arranged at the catch device for detecting a current operating position of the emergency release system and of the catch hook of the catch device; and operating the actuator, in terms of stopping a releasing action of the emergency release system on at least the catch device, when an actuation of the emergency release system above a predetermined recommended speed of the vehicle is detected, and whereby further the actuator is operated, in terms of stopping the releasing action of the emergency release system on at least the catch device, when due to the actuation of the emergency release system a release position of the catch hook of the catch device has already been brought about and detected by sensors, but a driving speed above a predetermined recommended speed of the vehicle is detected.

8. The method according to claim 7, wherein an electrically powered servo motor is used as the actuator.

9. The method according to claim 7, wherein microswitches are used as sensor units for detecting the current operating position of the emergency release system and of the catch hook of the catch device.

10. The method according to claim 7, wherein an optical and/or acoustic signal are provided to a driver of the vehicle when an actuation is detected of the emergency release system at least above the recommended speed.

11. The locking system according to claim 1, wherein the sensor unit arranged at the emergency release system is disposed directly at the emergency release system.

12. The locking system according to claim 1, wherein the emergency release system comprises a handle, and wherein the sensor unit arranged at the emergency release system is disposed directly on the handle and detects a pivoting movement and an axial movement of the handle.

13. The locking system according to claim 1, wherein the catch hook comprises an extension and the sensor unit arranged at the catch device is positioned at the extension.

14. The locking system according to claim 1, wherein the blocking element comprises an axially movable blocking element.

* * * * *